United States Patent [19]

Tokuyama et al.

[11] 4,216,513

[45] Aug. 5, 1980

[54] D.C. CIRCUIT BREAKER

[75] Inventors: Shunji Tokuyama; Hiroyuki Sugawara, both of Hitachi, Japan

[73] Assignee: Hitachi, Ltd., Tokyo, Japan

[21] Appl. No.: 906,263

[22] Filed: May 15, 1978

[30] Foreign Application Priority Data

May 18, 1977 [JP] Japan ................................ 52-56347

[51] Int. Cl.$^2$ ................................ H02H 7/22

[52] U.S. Cl. ................................ 361/13; 361/4; 361/8

[58] Field of Search ................................ 361/13, 4, 8, 9, 2; 200/144 B, 144 AP

[56] References Cited

U.S. PATENT DOCUMENTS

| | | | |
|---|---|---|---|
| 2,530,939 | 11/1950 | Browne, Jr. | 361/13 |
| 2,849,659 | 8/1958 | Kesselring | 361/13 X |
| 2,977,488 | 3/1961 | Walz et al. | 361/13 X |
| 3,522,472 | 8/1970 | Breitholtz | 315/126 |
| 4,027,123 | 5/1977 | Ihara | 361/13 X |

OTHER PUBLICATIONS

"H.V.D.C. Circuit Breakers Using Oscillating Current Techniques", by Yamada et al., Direct Current, Aug. 1966, pp. 87–107.

"Switchgear for H.V.D.C. Lines", by Kukekor et al., Direct Current, Jun. 1959.

*Primary Examiner*—Patrick R. Salce

*Attorney, Agent, or Firm*—Craig & Antonelli

[57] ABSTRACT

A capacitor and an inductance are connected in parallel with an interruptor disposed in a d-c circuit before the interruptor is mechanically opened. An oscillating current $i_o$ occurs in a circuit composed of the interruptor, the capacitor having a predetermined capacitance and the inductance having a predetermined amount of inductance when the interruptor is mechanically opened. The amplitude of the oscillating current $i_o$ is gradually increased and is superposed on a d-c current I. The interruptor breaks itself when the sum of the d-c current I and the oscillating current $i_o$ across the interruptor reaches zero.

8 Claims, 10 Drawing Figures

D.C. CIRCUIT BREAKER

BACKGROUND OF THE INVENTION

The present invention relates to a d-c circuit breaker and more particularly to a d-c circuit breaker which produces current zero to break a d-c current by superposing an oscillating current on the d-c current.

In general, it is difficult to break the d-c circuits as compared to breaking the a-c circuits, because of the fact that unlike the a-c currents, the d-c currents do not have a point at which the current becomes zero. A d-c circuit breaker or an interrupt or disposed in the d-c circuit is often opened by a widely known arc quenching method which connects a capacitor in parallel with the interrupt or to produce a current zero.

The capacitor and the interruptor connected in parallel constitute an oscillatory circuit together with the inductance contained in the parallel circuit. The inductance contains stray inductance in the oscillatory circuit as well as the inserted inductance, and the stray inductance is induced by the wirings and by the capacitor itself. The oscillatory circuit represents an L-C series resonance circuit of the capacitor and the inductance, and the oscillating current $i_o$ is generated by appropriately selecting the values of the capacitor and inductance (oscillating current $i_o$ occurs when the interruptor is opened).

The oscillating current $i_o$ is superposed on the d-c current I flowing from the d-c circuit to the interruptor, and a superposed current i ($i=I+i_o$) consisting of the d-c current I and the oscillating current $i_o$ flows across the electrodes of the interruptor. If these two currents are so selected that $i_o \geqq I$, the superposed current i produces a current zero. The arc produced across the electrodes of the interruptor is extinguished when the superposed current i becomes zero. In the aforementioned arc quenching method, the capacitor may be electrically charged to a predetermined potential or may not be charged before the capacitor is connected to the interruptor. In the following description, the former is referred to as a pre-charging method and the latter as a non-charging method.

In the pre-charging method, the capacitor is connected to the interruptor just before or just after the interruptor is opened. In either case, the produced oscillating current $i_o$ is approximately represented by the below-mentioned equation (1), and the amplitude of the oscillating current decreases almost exponentially due to the presence of ohmic resistance in the circuit.

$$i_o \simeq Ec\sqrt{\frac{C}{Lo}}\, e^{-\alpha t} \sin \frac{t}{\sqrt{LoC}} \quad (1)$$

where

Ec represents an initial charged voltage of the capacitor,

Lo an amount of inductance of the oscillatory circuit,

C capacitance of the capacitor, $\alpha$ a constant, and t a time.

Japanese Publication of Utility Model Application No. 40-18098 (1965) entitled "D-C Vacuum Circuit Breaker" discloses a breaker in which the capacitor is connected just before the interruptor is opened, and G. A. Kukekor et al "Switching-gear for H.V.D.C. Lines" Direct Current, June 1959, pp. 123-126, discloses a breaker in which the capacitor is connected just after the interruptor is opened.

In the pre-charging method, the following requirements are necessary so that the d-c current is successfully interrupted.

$$Imax \leqq Ec\sqrt{\frac{C}{Lo}} \quad (2)$$

$$\frac{di}{dt} < \beta \quad (3)$$

where Imax represents a maximum current that can be interrupted (hereinafter referred to as a maximum breakable current), and di/dt represents a time differential value of the current i when the superposed current i becomes zero (hereinafter referred to as a current slope) and is approximately represented by the equation (4)

$$\frac{di}{dt} \simeq (0.6\text{–}0.7)\frac{Ec}{Lo} \quad (4)$$

and $\beta$ represents a value specific to each interruptor; the breaking results in failure if the current slope exceeds the maximum current slope $\beta$.

Therefore, if the initial charged voltage of the capacitor Ec of the equation (2) is increased in order to increase the maximum breakable current Imax, the current slope di/dt given by the equation (4) is increased.

Therefore, in the aforementioned conventional devices, an inductance having an amount of inductance greater than several mH is directly connected to the capacitor so that Lo of the equation (4) will have an amount of inductance greater than several mH, thereby to restrain the current slope di/dt. It is therefore difficult to increase the frequency f of the oscillating current $i_o$ given by the equation (5) to a value above 1 kHz.

$$f = 1/(2\pi\sqrt{LoC}) \quad (5)$$

Further, in the pre-charging method, it is impossible to bring the current slope di/dt at the time of breaking into zero, irrespective of the magnitude of the d-c current I that is to be broken. The current slope di/dt can be brought into zero when the magnitude of the d-c current to be broken is in agreement with the amplitude of the oscillating current $i_o$. With the aforementioned pre-charging method, however, if the magnitude of the d-c current I which is to be broken undergoes variation even when the current slope di/dt is selected to be zero at a particular d-c current, the current slope di/dt tends to be increased.

In the non-charging method, on the other hand, the capacitor is connected in parallel with the interruptor via a spark gap or an auxiliary switch when the arc voltage across the electrodes of the interruptor reached a predetermined value after the interruptor has been opened. The oscillating current $i_o$ in this case corresponds to that of the pre-charging method in which the initial charged voltage of the capacitor Ec is substituted by an arc voltage Va at the time of connecting the capacitor. A maximum breakable current Imax in this case is represented by the following equation $$Imax \leqq Va\sqrt{\frac{C}{Lo}} \quad (6)$$

The upper limit of the arc voltage Va will be about 2 KV. In the non-charging method, therefore, in order to increase the maximum breakable current Imax, the amount of inductance Lo of the oscillatory circuit must be reduced as disclosed in H. Härtel "Nebenwege für HGU-Schalter" ETZ-A Bd. 91 (1970) H.2, pp. 79 to 82. Therefore, Lo had been selected to be smaller than 5 μH. Accordingly, with the non-charging method, the oscillating current of a frequency f of up to about 10 KHz can be treated, but it is difficult to break the circuit at a current slope $di/dt \simeq 0$ regardless of the change in d-c current I to be broken, because of the same reasons as those of the case of the pre-charging method.

In the aforementioned arc quenching method, the amplitude of the generated oscillating current $i_o$ is decreased with the passage of time. According to N. Yamada et al "H.V.D.C. Circuit Breakers Using Oscillating Current Techniques" Direct Current, August 1966, pp. 87 to 67, however, the oscillating current with gradually increasing amplitude (hereinafter referred to as divergent oscillating current) is generated by the aforementioned non-charging method. The divergent oscillating current has a region which exhibits such a characteristic that the arc voltage is increased with the decrease in arc current of the interruptor (hereinafter referred to as a negative arc resistance characteristic), and is generated when the d-c current I to be broken lies within this negative arc resistance region. The method disclosed in the above literature of N. Yamada et al employs the divergent oscillating current. With this method, however, since the capacitor is connected in parallel with the interruptor after the arc voltage is raised to a predetermined value, it is impossible to break the circuit at a current slope $di/dt \simeq 0$ irrespective of the change in d-c current I.

Other relevant prior arts are as follows:

(1) U.S. Pat. No. 3,522,472 entitled "Direct Current Breaker".

This patent discloses a d-c current breaker which has an oscillatory circuit formed of an interruptor, and a series circuit of a capacitor and a coil connected in parallel with the interruptor. The oscillatory circuit is referred to on column 6, lines 40 to 50 of the specification and in FIGS. *8a* and *8b*.

(2) Japanese Publication of Utility Model Application No. 40-10355 (1965) entitled "D-C Vacuum Circuit Breaker".

This publication discloses a d-c vacuum circuit breaker based on the pre-charging method. The pre-charging method is referred to on column 1, lines 1 to 21 and in FIG. 1.

SUMMARY OF THE INVENTION

An object of the present invention is to provide a d-c circuit breaker by which the current slope di/dt can be set at near zero irrespective of the magnitude of the d-c current to be broken. To restrain the current slope at a small value contributes to heighten a maximum breakable current of the breaker.

Another object of the present invention is to provide a d-c current breaker which is capable of breaking the d-c current within short period of time by increasing the frequency of the oscillating current to be greater than 1 KHz and reducing the time from the moment the electrodes of the interruptor start to open until a current zero is produced.

A further object of the present invention is to provide a d-c circuit breaker which exhibits a maximum breakable current when the amount of inductance of the oscillating circuit is over a range of 10 μH to 100 μH.

According to the present invention, a capacitor and an inductance are connected, at least simultaneously when an interruptor is mechanically opened, to an interruptor to break the d-c current in its negative arc resistance characteristic region while said interruptor is mechanically opened, thereby generating an oscillating current of which amplitude increases gradually, whereby the oscillating current is superposed on the d-c current flowing from a d-c circuit, thereby to interrupt the d-c current when the sum of the d-c current and the oscillating current reached a current zero.

DESCRIPTION OF THE PREFERRED EMBODIMENT

Figure 1:
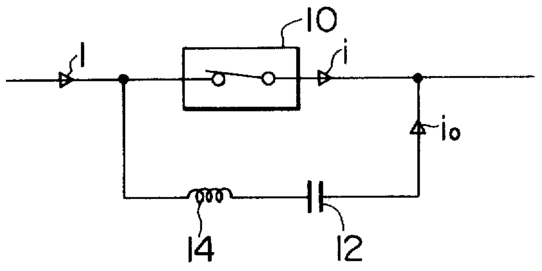
FIG. 1 is a wiring diagram to illustrate the principle of the present invention.

Referring to FIG. 1, an interruptor 10 provided in a d-c circuit is so constructed that a d-c current I to be broken will lie within a negative arc resistance region of the interruptor 10. Conventional a-c air-blast circuit breaker, vacuum circuit breaker and magnetic blow-out circuit breaker can suitably be employed as the interruptor 10. A series circuit consisting of a capacitor 12 and an inductance 14 is connected in parallel with the interruptor 10 without interposing auxiliary switch or spark gap.

Figure 2:
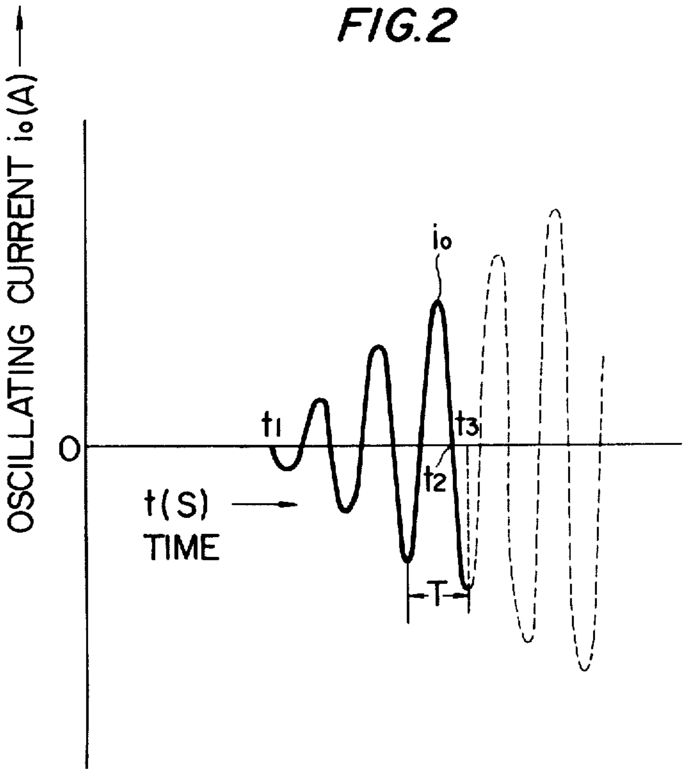
FIG. 2 is a waveform diagram of an oscillating current $i_o$ of FIG. 1.

When the interruptor 10 is being closed, the capacitor 12 is substantially short-circuited by the interruptor 10 and is not electrically charged. The interruptor 10 is served with a d-c current I from a d-c power source which is not shown here. When electrodes of the interruptor 10 commence to be mechanically opened at a time $t_1$ upon receiving a breaking signal, an arc develops across the electrodes of the interruptor. On the other hand, a divergent oscillating current $i_o$ shown in FIG. 2 is generated owing to a negative arc resistance characteristic of the interruptor 10, predetermined capacitance of the capacitor 12 and an amount of inductance of the inductance 14. The divergent oscillating current $i_o$ is given by the equation (7), and is superposed on a d-c current flowing from a d-c power source to the interruptor 10.

$$i_o \simeq A\sqrt{\frac{C}{Lo}}\, e^{-\frac{R}{2Lo}t} \cdot \sin\frac{1}{\sqrt{LoC}}\, t \quad (7)$$

where

A represents a constant,

C a capacitance of the capacitor 12,

Lo an amount of inductance of the inductance 14, and

R represents a resistance of the arc.

Figure 3:
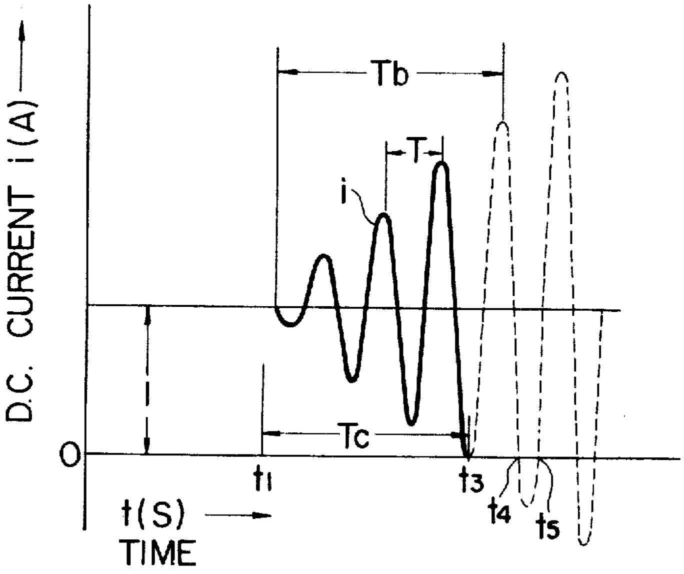
FIG. 3 is a waveform diagram of a superposed current i flowing into the interruptor when the circuit of FIG. 1 is broken.

Therefore, the superposed current i flowing through the interruptor 10 develops a current zero as shown in FIG. 3, so that the arc across the interruptor 10 is quenched at a time $t_3$. Even if the extinction of arc resulted in failure at the time $t_3$ at which the first current zero is developed, the arc will be extinguished at the subsequent current zero points $t_4$, $t_5$, . . . This is the advantage of the employment of divergent oscillating current, which presents a number of current zero points.

Furthermore, the amplitude of the superposed current i increases gradually as shown in FIG. 3 and reaches the current zero, whereby the circuit is broken at a current slope $di/dt \simeq 0$, even when the d-c current I is varied. As a result, the maximum breakable current Imax can be raised without increasing the amount of inductance of the oscillatory circuit to be greater than several mH or conversely to be lower than several mH. Moreover, the current slope is not increased even if the frequency of the oscillating current is increased to be higher than 1 KHz, whereby the interrupting time can be reduced.

After the arc is extinguished, the d-c current I flows into the capacitor 12 to electrically charge it up to a voltage of the d-c power source. After the capacitor 12 has been charged, the d-c current I becomes zero to complete the interruption.

Figure 4:
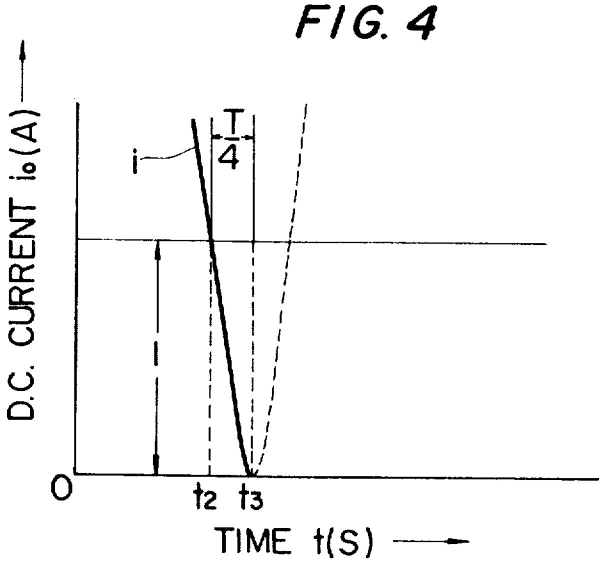
FIG. 4 is a waveform diagram for illustrating in detail the superposed current i in the proximity of current zero.

In order for the interruptor to complete the interruption within the predetermined period of time, the frequency f of the divergent oscillating current $i_o$ must be set at a middle point between the frequency $f_L$ and the frequency $f_H$. The current slope $di/dt \simeq 0$ means that a minimum value of the superposed current i comes into contact with the line of current zero in FIG. 4. Therefore, as shown in FIG. 4, the superposed current i flowing through the interruptor 10 decreases from the time $t_2$ to time $t_3$ and finally reaches the current zero. If the breaking resulted in failure, the current i increases as indicated by a dotted line, and the breaking is not performed until the next current zero is reached. In the circuit breaker, on the other hand, the resistance of the arc does not immediately become infinity even when the arc current reached zero but rather increases exponentially according to a predetermined time constant Ta of the arc. Therefore, the resistance of the arc must have been sufficiently increased within a time T/4 (T: period of the oscillating current $i_o$) within which the current i starts to decrease and reaches the current zero. The circuit having a time constant requires a time which is about 5 times longer than the time constant before said circuit perfectly restores a steady state. Therefore, the breaking results in failure unless the equation (8) is satisfied.

$$T/4 > 5Ta$$

therefore, $$T > 20Ta \quad (8)$$

The equation (8) can be satisfied if the frequency f of the oscillating current $i_o$ is selected to be smaller than the frequency $f_H$ given by the equation (9).

$$f_H = 1/(20Ta) \quad (9)$$

Further, the arc must be extinguished while the interruptor 10 is having a breaking ability, i.e., within a maximum allowable arc time Tb. Accordingly, the amplitude of the divergent oscillating current $i_o$ must become greater than the d-c current I which is to be interrupted within the maximum allowable arc time Tb, so that the superposed current i develops current zero. The time $t_3$ at which the first current zero develops is related to the equation (7), and mainly depends upon the capacitance C and the amount of inductance Lo in the oscillatory circuit; the time $t_3$ advances as the amplitude of the divergent oscillating current $i_o$ is reduced. Hence, the frequency f of the oscillating current $i_o$ is selected to be greater than the frequency $f_L$ at which the time $t_c$ ($t_c = t_3 - t_1$) becomes equal to the maximum allowable arc time Tb, so that the initial current zero point always occurs within the time Tb.

Figure 5:
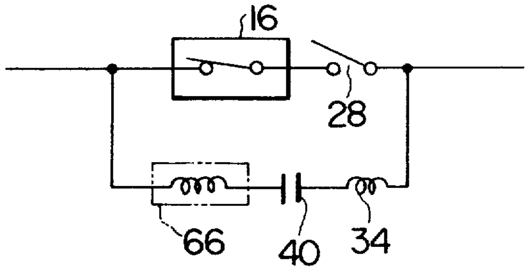
FIG. 5 is a wiring diagram to illustrate an embodiment of the present invention.
Figure 6:
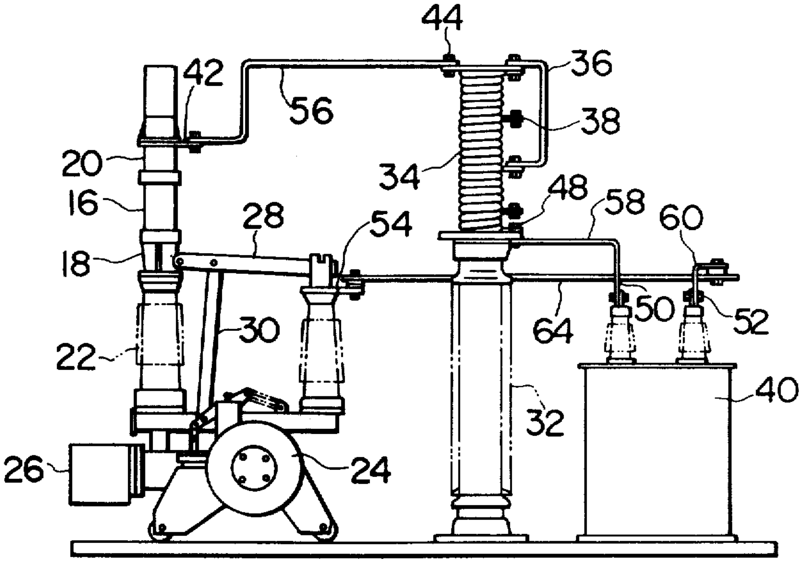
FIG. 6 is a diagram showing the appearance of the embodiment of FIG. 5.

FIG. 5 and FIG. 6 show an embodiment of the present invention, in which a breaking portion 16 of the air blast circuit breaker is supported between a lower bracket 18 and an upper bracket 20. In this case, the breaking current is so selected that the d-c current I to be interrupted lies in a negative arc resistance region of the breaking portion 16.

To open the breaking portion 16, the compressed air stored in an air tank 24 is supplied through an air-supplying porcelain tube 22.

The breaking portion 16 is closed and opened depending upon the opening-closing operation of a magnet valve 26 provided between the porcelain tube 22 and the air tank 24. A disconnecting portion 28 provided in series with the breaking portion 16 is opened by a lever 30 after the breaking portion 16 is opened. A porcelain support 32 supports an air-core reactor 34 composed by winding a conductor on an insulating cylinder. The air-core reactor 34 is equipped with tap changers 36, 38 for adjusting the amount of inductance Lo in the oscillating circuit. An oil condenser 40 is provided in parallel with the porcelain support 32.

The breaking portion 16, oil condenser 40 and air-core reactor 34 have terminals 42, 44, 46, 48, 50, 52 and 54 which are connected by means of conductors 56, 58, 60 and 64, constituting a circuit as shown in FIG. 5. A stray inductance 66 consists of stray inductances possessed by the oil condenser 40 and conducts 56 to 64. The breaking portion 16, oil condenser 40, air-core reactor 34 and stray inductance 66 respectively correspond to the interruptor 10, capacitor 12 and inductance 14 mentioned with reference to FIG. 1, and interrupt the d-c current I as illustrated with reference to FIG. 1.

In the aforementioned embodiment, when Ta = 2 μsec, C = 4 μF, Lo = 500 μH, R = −2 ohms and A = 1000, the d-c current I of 700 ampers was interrupted about 1 millisecond after the interruptor 16 was started to open. After about 3.5 cycles (after 1 millisecond) from the time the interruptor started to open, the oscillating current $i_o$ exceeded the d-c current I, and the superposed current i developed current zero. In this case, if the aforesaid values are inserted into the equations (7) and (9), the frequencies $f_L$ and $f_H$ are about 3.5 KHz and 25 KHz, respectively.

Figure 7:
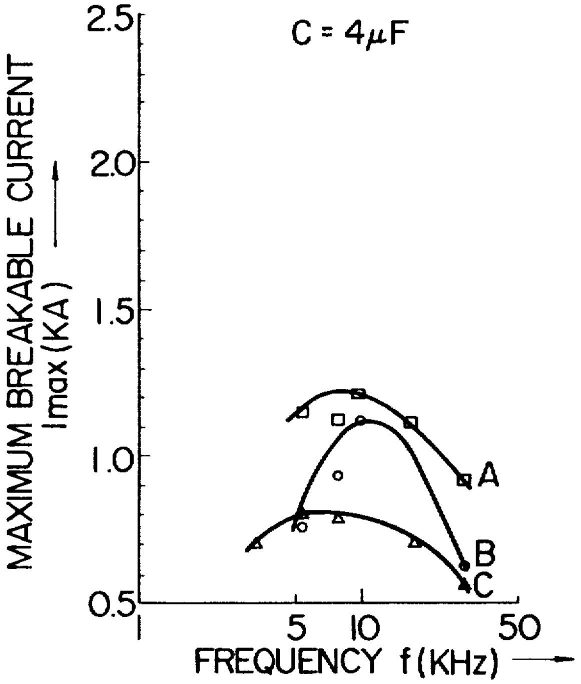
FIG. 7 to FIG. 9 are graphs showing relations between the frequency f of the oscillating current and a maximum breakable current Imax in the embodiment shown in FIG. 5.
Figure 8:
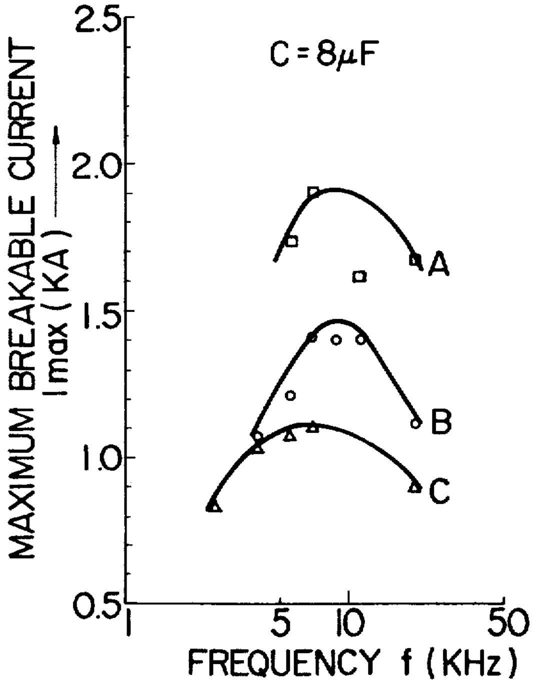
Figure 9:
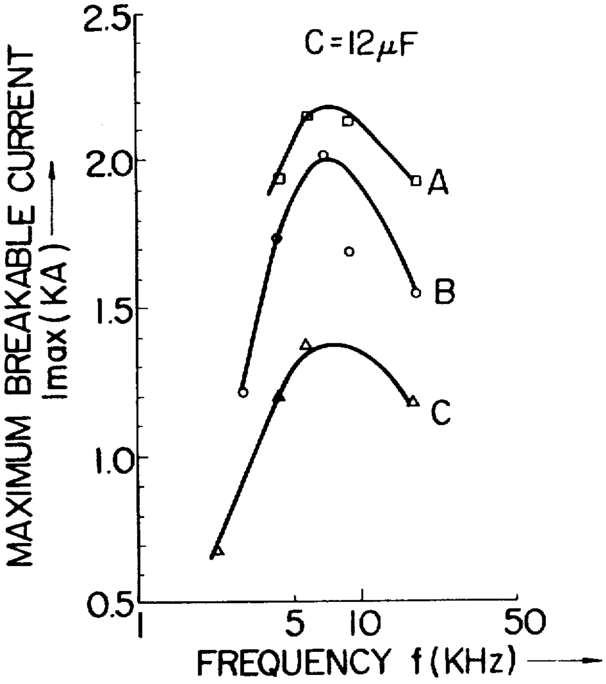

FIG. 7 to FIG. 9 are graphs showing relations between the frequency f of the oscillating current and the maximum breakable current Imax according to the embodiment of the present invention, and in which are shown maximum breakable currents Imax when the capacitance is varied to 4 μF and 12 μF for the three interruptors A, B and C. A represents an air-blast circuit breaker using a square nozzle made of a combination of an insulating material and a metal, B represents an air-blast circuit breaker using a cylindrical nozzle made of a combination of an insulating material and a metal, and C represents an air-blast circuit breaker using a cylindrical metal nozzle. In any case, the maximum breakable circuit Imax increases at frequencies near 5 to 10 KHz and drastically decreases on both sides thereof.

Figure 10:
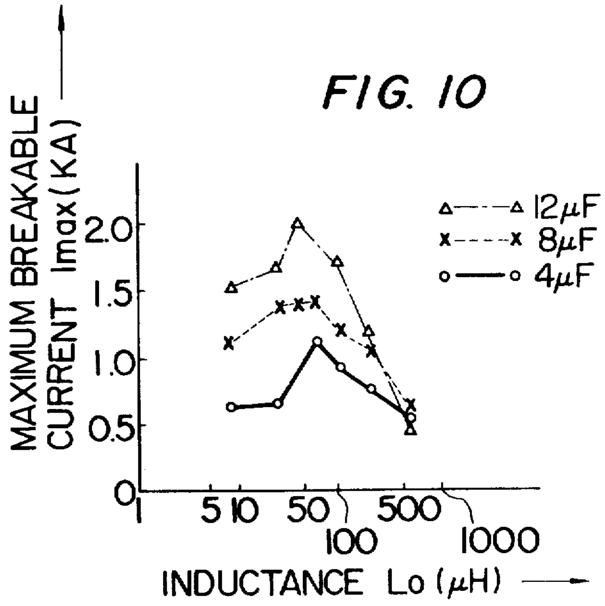
FIG. 10 is a graph showing a relation between the amount of inductance Lo of the oscillatory circuit and a maximum breakable current Imax in accordance with the embodiment of FIG. 5.

FIG. 10 is a graph plotting maximum breakable currents Imax by varying the inductance with the capacitance as a parameter in accordance with the embodiment of the present invention. Referring to FIG. 10, if the amount of inductance of the oscillatory circuit exceeds 500 μH, the maximum breakable current Imax does not increase even if the capacitance is increased. Further, when the capacitances are 4 μF and 8 μF, increased maximum breakable currents Imax are exhibited when the inductances are near 60 μH and 40 μH. Great maximum breakable currents Imax is attained when the amount of inductance Lo of the oscillatory circuit lies from 10 μH to 100 μH, and the capacitance is 4 to 12 μF, i.e., when the frequency f of the oscillating current lies over a range of 4.5 to 25 KHz.

What is claimed is:

1. A d-c circuit breaker which produces current zero to break d-c current by superposing an oscillating current on the d-c current, comprising:

an interruptor for breaking the d-c current within the negative arc resistance characteristic region while said interruptor is mechanically opened to break the d-c current;

a capacitor without being charged being electrically connected in parallel with said interruptor at least simultaneously with the mechanical opening of said interruptor; and an inductance electrically connected in series with said interruptor and said capacitor, the capacitance of said capacitor and the amount of inductance of said inductance being selected such that the oscillating current of predetermined frequency is produced and the amplitude of the oscillating current is gradually increased when said interruptor is mechanically opened to break the d-c current;

wherein said interruptor breaks the d-c current when the sum of the d-c current and the oscillating current across said interruptor reaches zero.

2. A d-c circuit breaker which produces current zero to break d-c current by superposing an oscillating current on the d-c current according to claim 1, wherein the predetermined frequency of said oscillating current is between such a first frequency that a quarter period of the oscillating current is five times greater than the time constant of the arc and such a second frequency that the amplitude of the oscillating current exceeds the amount of the d-c current within a maximum allowable arc time.

3. A d-c circuit breaker which produces current zero to break d-c current by superposing an oscillating current on the d-c current according to claim 1, wherein said inductance comprises a stray inductance and an inductance coil, and said stray inductance and said inductance coil are electrically connected in series with said capacitor.

4. A d-c circuit breaker which produces current zero to break d-c current by superposing an oscillating current on the d-c current, comprising:

an interruptor for breaking the d-c current within the negative arc resistance characteristic region while said interruptor is mechanically opened to break the d-c current; and a series circuit consisting of a capacitor, a stray inductance and an inductance coil connected in parallel with said interruptor, said capacitor being in a non-charged condition beforehand and having a capacitance of from 4 μF to 12 82 F, the total amount of inductance of the stray inductance and the inductance coil being 10 μH to 100 μH;

wherein the oscillating current of a predetermined frequency of from 4.5 KHz to 25 KHz is produced in said interruptor and in said series circuit, and the amplitude of the oscillating current is gradually increased when said interruptor is mechanically opened to break the d-c current; and said interruptor breaks the d-c current when the sum of the d-c current and the oscillating current across said interruptor reaches zero.

5. A d-c circuit breaker which produces current zero to break d-c current by superposing an oscillating current on the d-c current according to claim 1, wherein the sum of the d-c current I and the oscillating current $i_o$ is a superposed current i and said interrupter breaks the d-c current even with the current slope $di/dt \simeq 0$.

6. A d-c circuit breaker which produces current zero to break d-c current by superposing an oscillating current on the d-c current according to claim 1, wherein the oscillating current produced is a divergent oscillating current.

7. A d-c circuit breaker which produces current zero to break d-c current by superposing an oscillating current on the d-c current according to claim 4, wherein the sum of the d-c current I and the oscillating current $i_o$ is a superposed current i and said interrupter breaks the d-c current even with the current slope $di/dt \simeq 0$.

8. A d-c circuit breaker which produces current zero to break d-c current by superposing an oscillating current on the d-c current according to claim 4, wherein the oscillating current produced is a divergent oscillating current.

* * * * *